(12) United States Patent
Sullivan

(10) Patent No.: US 6,648,788 B1
(45) Date of Patent: Nov. 18, 2003

(54) FORWARD CARRIER ASSEMBLY FOR TANDEM AXLE

(75) Inventor: William C. Sullivan, Newark, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 12 days.

(21) Appl. No.: 10/127,584

(22) Filed: Apr. 26, 2002

(51) Int. Cl.[7] .................. B60K 17/16; B60K 17/348; B62D 61/10
(52) U.S. Cl. .................. 475/221; 180/24.09; 180/248
(58) Field of Search .................. 475/221, 200, 475/202; 180/24.09, 248, 249

(56) References Cited

U.S. PATENT DOCUMENTS

| | | | |
|---|---|---|---|
| 2,693,244 A | * 11/1954 | Rockwell et al. | 180/24.09 |
| 2,699,075 A | * 1/1955 | Buckendale | 180/24.09 |
| RE25,269 E | 10/1962 | Christie | |
| 3,532,183 A | * 10/1970 | Shealy | 180/24.09 |
| 3,887,037 A | * 6/1975 | Haluda et al. | 180/24.11 |
| 4,050,534 A | 9/1977 | Nelson | |
| 5,860,889 A | 1/1999 | Schlosser | |
| 6,200,240 B1 | * 3/2001 | Oates | 475/221 |

OTHER PUBLICATIONS

A.F. Andreev, V. V. Vantesevich, A. Kh. Lefarov: "Inter-wheel Differential Drive; Differential s of Wheeled Vehicles", Moscow Mashinostroyenie, 1987, pp. 35–45. Translation of above–noted Russian reference.

* cited by examiner

Primary Examiner—Ankur Parekh
(74) Attorney, Agent, or Firm—Carlson, Gaskey & Olds

(57) ABSTRACT

A tandem axle assembly includes a forward drive axle coupled to a rear drive axle with a connecting driveshaft. An inter-axle differential (IAD) located in a carrier assembly for the forward drive axle takes driving input and splits the input between the forward and rear drive axles. The IAD transfers driving force to a ring and pinion gear assembly in the carrier assembly for the forward drive axle and transfers driving force to a thru-shaft that is operably coupled to drive the rear drive axle via the connecting driveshaft. The pinion gear includes a first portion defining a pinion gear head and a second portion defining a hollow pinion support shaft that extends into the IAD. The pinion support shaft applies a thrust load to an IAD bearing via an IAD gear assembly to permit reverse load sharing. The thru-shaft extends through the hollow pinion support shaft such that the thru-shaft and the pinion gear rotate about a common axis. The ring and pinion gear assembly are coupled to a differential assembly that drives a pair of axle shafts. The differential assembly includes first and second case halves that attach to each other at an interface to define a case split line. The ring gear, first case half, and second case half are all connected together via a single bolted joint with the case split line being located behind the ring gear.

25 Claims, 4 Drawing Sheets

FORWARD CARRIER ASSEMBLY FOR TANDEM AXLE

BACKGROUND OF THE INVENTION

This invention relates to a unique carrier, axle differential, and inter-axle differential assembly configuration for a tandem drive axle.

Tandem drive axle assemblies include a forward drive axle and a rear drive axle interconnected by a driveshaft. A single driving input is operably coupled to the forward drive axle, which includes an inter-axle differential (IAD). The IAD splits the driving force from the input between the forward and rear drive axles. A thru-shaft interconnects the IAD to the driveshaft that provides input to the rear drive axle.

The forward and rear drive axles each include a carrier with a differential gear assembly to prevent wheel skid during turning maneuvers. When a vehicle travels along a straight-line path, both sets of wheels on a drive axle will turn at basically the same speed. During a turning maneuver, however, the wheels on the outside of the turn must travel a greater distance than the wheels on the inside of the turn, which means that the wheels on the outside of the turn must rotate at a faster speed than the wheels on the inside of the turn. A differential gear assembly is required to allow for this difference in wheel speed.

Traditionally, the forward drive axle carrier includes helical gear set that transfers the driving force from the input at the IAD to a ring and pinion gear set that is operably coupled to the differential assembly. The differential assembly includes a first differential case half, a second differential case half, and a differential gear set. The ring gear is bolted to one of the case halves to define a first bolted joint and the first and second case halves are bolted together to define a second bolted joint.

The helical gear configuration is also required to permit the thru-shaft to pass the differential case assembly. This configuration severely limits the overall size of the differential because sufficient clearance is required to allow the thru-shaft to operate. The thru-shaft is mounted within the forward axle housing by a pair of bearings supported by a separate cage member that is bolted to the housing.

This traditional differential case and thru-shaft configuration is expensive to manufacture and difficult to assemble. Also, with the increased demand by users to provide more robust designs within the same packaging space, these traditional configurations do not provide room to make critical components more robust within the existing package. Further, the IAD and helical gear configuration often require a separate pumping mechanism to force feed oil through the assembly. This additional pumping mechanism increases cost and adds weight to the assembly, which is undesirable.

Accordingly, it is desirable to provide an improved forward drive carrier with a differential assembly that includes a more robust component configuration within the same package. Further, it is desirable to provide a simplified carrier and thru-shaft configuration that reduces the overall number of required components and is less expensive to manufacture, as well as overcoming the other deficiencies in the art outlined above.

SUMMARY OF THE INVENTION

A tandem axle set includes a forward drive axle and a rear drive axle that are coupled together with a connecting driveshaft. The forward drive axle includes a forward carrier assembly coupled to a vehicle input and which drives a forward pair of axle shafts. An inter-axle differential (IAD) in the forward carrier assembly splits driving force between the forward and rear drive axles. A thru-shaft is coupled to the IAD at one end and to an output at the connecting driveshaft at an opposite end. The connecting driveshaft is coupled to drive a rear carrier assembly that drives a rear pair of axle shafts.

The forward carrier assembly includes a forward drive gear assembly that is operably coupled to the forward pair of axle shafts. The forward drive gear assembly includes a pinion gear, a ring gear, and a forward differential assembly. The differential assembly includes first and second differential case halves attachable at a case interface to define a case split line. The differential assembly also includes a differential gear assembly supported by the first and second differential case halves with the gear assembly being operably coupled to drive the forward pair of axle shafts. The ring gear is mounted to the differential case halves. The IAD provides driving power to the pinion gear that meshes with the ring gear to drive the axle shafts via the differential gear assembly.

The IAD includes differential spider, a plurality of spider gears supported on the differential spider, an inner side gear in meshing engagement with the spider gears, and an outer side gear in meshing engagement with the spider gears. The. differential spider, spider gears, and inner and outer side gears are substantially enclosed within an IAD housing. The housing is rotatably supported on an IAD bearing assembly. The pinion gear is mounted for rotation with the inner side gear to provide driving input to the forward drive axle. The thru-shaft is splined for rotation with the outer side gear to provide driving input to the rear drive axle.

In the preferred embodiment, the pinion gear. includes a first piece defining a pinion gear head and a second piece defining a hollow pinion support shaft that extends into the IAD. The thru-shaft extends through the hollow pinion support shaft such that the pinion gear and thru-shaft rotate about a common axis. The pinion support shaft has an inner end that supports the first piece and an outer end that extends into the inter-axle differential assembly for applying a thrust load to the inter-axle differential bearing assembly to permit reverse load sharing.

In one disclosed embodiment, the pinion gear is supported by a pair of bearings including an inner bearing and outer bearing positioned on opposing sides of the pinion gear head. The outer bearing is supported on the first piece and the inner bearing is supported on the second piece. Preferably, the inner and outer bearings are tapered roller bearings.

The first piece of the pinion gear includes a hollow sleeve portion that extends outwardly from the pinion gear head in a direction toward the IAD. The second piece, defining the pinion support shaft, extends through the hollow sleeve portion. The inner end of the pinion support shaft extends beyond the pinion gear head to support the inner bearing. The pinion support shaft includes a center flange portion that abuts against a distal end of the hollow sleeve portion. Preferably, the pinion support shaft is fixed for rotation with the inner side gear at a center position between the inner and outer ends and adjacent to the center flange portion.

Preferably, the outer end of the pinion support shaft extends into the IAD to abut against the outer side gear. Thus, the thrust load is applied to the IAD bearing assembly via the outer side gear. Further, the thru-shaft extends beyond the pinion support shaft and is fixed for rotation with the outer side gear.

The subject invention provides an improved carrier and inter-axle differential configuration for a forward drive axle in a tandem axle set that significantly reduces the number of required components, improves and simplifies assembly, as well as providing a more robust design within a traditionally sized packaging envelope. These and other features of the present invention can be best understood from the following specifications and drawings, the following of which is a brief description.

DETAILED DESCRIPTION OF A PREFERRED EMBODIMENT

Figure 1:
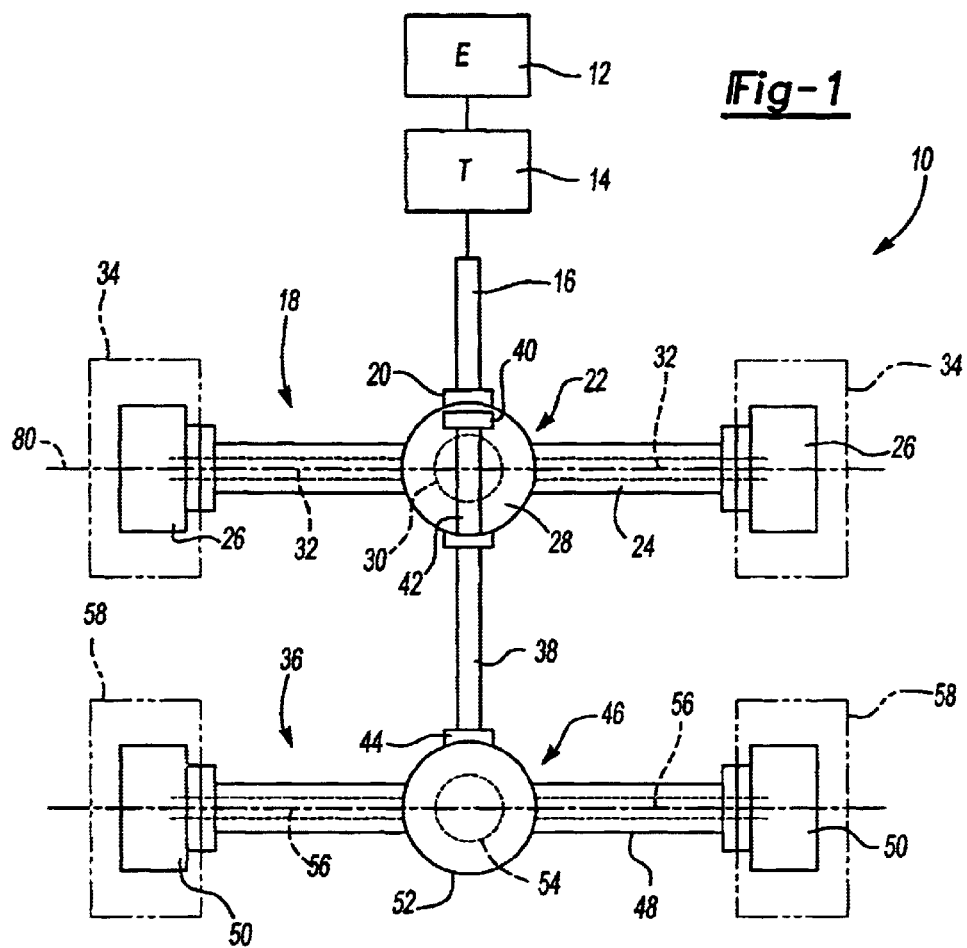
FIG. 1 is a schematic overhead view of a powertrain assembly for a tandem drive axle set.

A powertrain assembly is shown generally at 10 in FIG. 1. The powertrain assembly 10 includes an engine 12 and transmission 14 that drive a driveshaft 16 as is known in the art. The driveshaft 16 is coupled to a forward drive axle 18 of a tandem axle set at an input 20. The forward drive axle 18 includes a carrier 22, axle housing 24, and a pair of laterally spaced wheel ends 26 positioned on opposing ends of the axle housing 24. The carrier 22 includes a carrier housing 28 and differential assembly 30 that is operably coupled to drive a pair of axle shafts 32. The axle shafts 32 drive the wheel ends 26, which support tires 34 as is known in the art.

The tandem axle set also includes a rear drive axle 36 that is coupled to the forward drive axle 18 with a connecting driveshaft 38. An inter-axle differential (IAD) 40, located in the forward carrier 22, splits driving power supplied at the input 20 between the forward 18 and rear 36 drive axles. The IAD 40 drives the differential assembly 30 in the forward drive axle 18 and transfers driving power to the connecting driveshaft 28 for the rear drive axle 26 via a thru-shaft 42. The connecting driveshaft 38 is coupled to the rear drive axle 26 at input 44.

The rear drive axle 36 includes a carrier 46, axle housing 48, and a pair of laterally spaced wheel ends 50 positioned on opposing ends of the axle housing 48. The carrier 46, includes a carrier housing 52 and differential assembly 54 that is operably coupled to drive a pair of axle shafts 56. The axle shafts 56 drive the wheel ends 50, which support tires 58 as discussed above.

Figure 2:
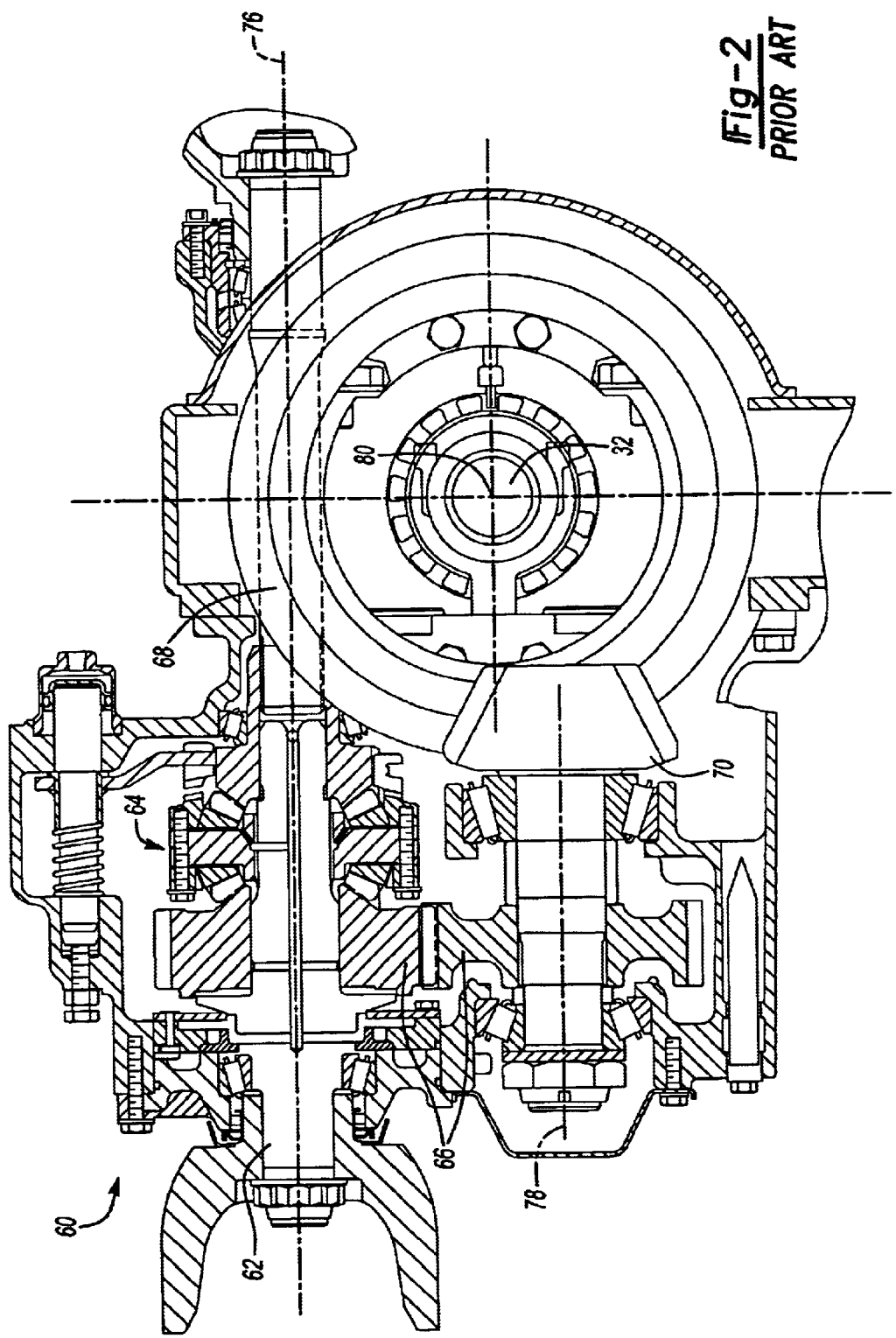
FIG. 2 is a cross-sectional side view of a carrier assembly for a forward drive axle in a prior art tandem axle set.

A traditional carrier assembly 60 for a forward drive axle 18 in a tandem set is shown in FIG. 2. The carrier assembly 60 includes an input 62 to an inter-axle differential assembly (IAD) 64 that splits the driving input between a gearset 66 in the forward drive axle 18 and a thru-shaft 68 that transfers driving power to the rear drive axle 36. The gearset 66 is a helical gearset that transfers the driving power from the input 62 down to a gear assembly including a pinion gear 70 and ring gear 72. The pinion 70 and ring 72 gears drive a differential assembly 74 (shown in FIG. 3), which in turn drives the axle shafts 32. The operation of the helical gearset in combination with the ring 72 and pinion 70 gears is well known and will not be discussed in detail.

The thru-shaft 68 defines a thru-shaft axis of rotation 76 that is vertically higher than a pinion gear axis of rotation 78. The axle shafts 32 define an axle shaft axis of rotation 80 that is transverse to the thru-shaft 76 and pinion gear 78 axes of rotation. In the configuration shown in FIG. 2, the pinion gear axis of rotation 78 is vertically lower than the axle shaft axis of rotation 80 and the thru-shaft axis of rotation 76 is vertically higher than the axle shaft axis of rotation 80. The helical gear configuration is required to permit the thru-shaft 68 to pass the differential assembly 74. This configuration severely limits the overall size of the differential because sufficient clearance is required to allow the thru-shaft 68 to operate.

Figure 3:
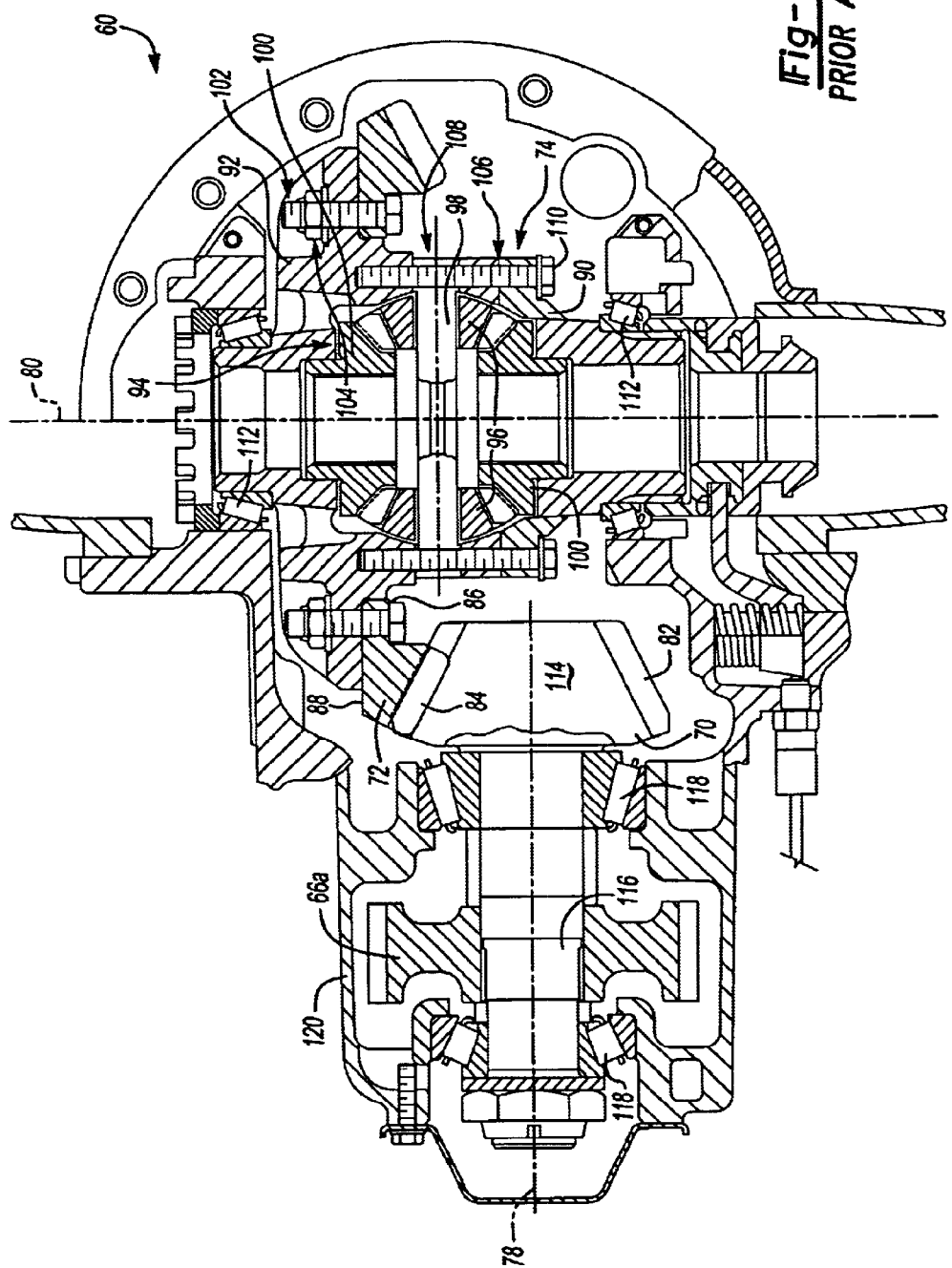
FIG. 3 is a cross-sectional top view of the carrier assembly of FIG. 2.

As shown in greater detail in FIG. 3, the pinion gear 70 includes a plurality of pinion teeth 82 that mesh with a plurality of ring gear teeth 84 formed on the ring gear 72. The ring gear 72 includes a front face 86 on which the ring gear teeth 84 are formed and a back face 88. The pinion gear 70 drives the ring gear 72, which is operably coupled, to the differential assembly 74.

The differential assembly 74 includes a first differential case half 90, a second differential case half 92, and a differential gear assembly 94. The first 90 and second 92 differential case halves support the differential gear assembly 94. The differential gear assembly 94 includes four (4) differential pinion gears 96 (only two are shown), supported on a four-legged differential spider 98 as is known in the art. The differential pinion gears 96 intermesh with a pair of side gears 100 that are splined to the axle shafts 32. The operation of the differential assembly 74 is well known and will not be discussed in detail.

The ring gear 72 is attached to the second differential case half 92 at a first bolted joint 102 with a plurality of fasteners 104. The first 90 and second 92 differential case halves are attached to each other, defining a differential case split line 106, at a second bolted joint 108 with a plurality of fasteners 110. The differential case split line 106 is positioned on the front side 86 of the ring gear 72. The differential case halves 90, 92 are supported by a pair of bearings 112 having a traditional mounting configuration with bearing apexes extending toward each other.

The pinion gear 70 includes a pinion gear head 114 supported on a shaft portion 116 that extends through the center of one of the helical gears 66a. A pair of pinion bearings 118 support the pinion gear 70 for rotation relative to a carrier housing 120. The pinion bearings 118 are mounted outwardly of from pinion gear head 114 and are located on opposing sides of the helical gear 66a.

This traditional carrier assembly 60 configuration for a forward drive axle 18 is expensive to manufacture and difficult to assemble. Also, with the increased demand for more robust component designs within the same packaging space, these traditional configurations do not provide room to make critical components more robust within the existing package.

Figure 4:
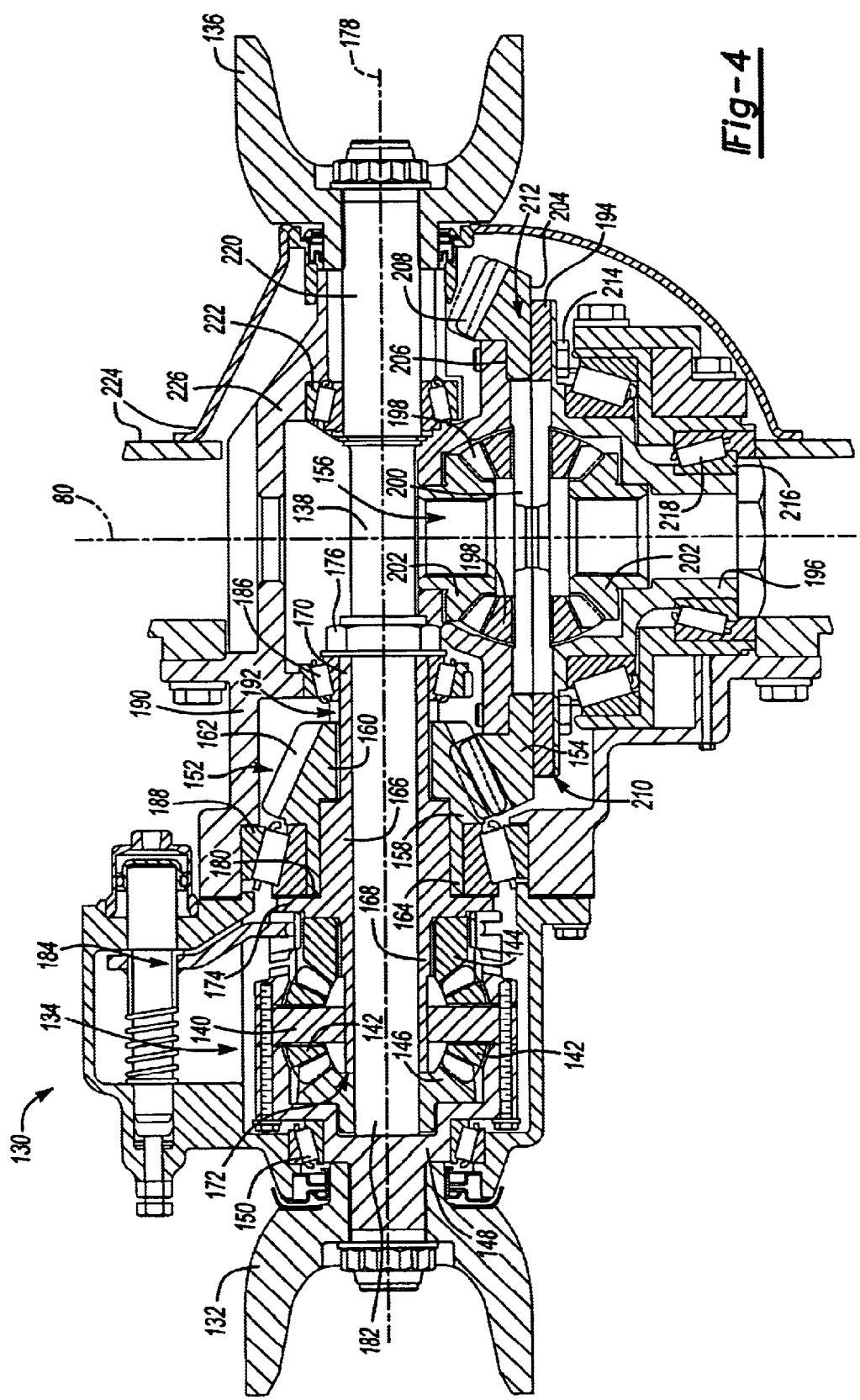
FIG. 4 is a cross-section top view of a carrier assembly for a forward drive axle in a tandem axle set incorporating the subject invention.

The subject invention as shown in FIG. 4 provides an improved carrier configuration for a forward drive axle 18 that significantly reduces the number of components, is easy to assemble, and provides more robust components than traditional configurations. An improved carrier assembly for a forward drive axle 18 in a tandem set shown generally at 130 in FIG. 4. The carrier assembly 130 includes an input 132 coupled to an inter-axle differential assembly (IAD) 134 that splits driving input between the forward drive axle 18 and the rear drive axle 36. The IAD 134 transfers driving input to an output 136 for the forward drive axle via a thru-shaft 138.

The IAD 134 includes a includes differential spider 140, a plurality of spider gears 142 supported on the differential spider 140, an inner side gear 144 in meshing engagement with the spider gears 142, and an outer side gear 146 in meshing engagement with the spider gears 142. The differential spider 140, spider gears 142, and inner 144 and outer 146 side gears are substantially enclosed within an IAD housing 148. The housing 148 is rotatably supported on an IAD bearing assembly 150. Preferably, the IAD bearing assembly is a single tapered roller bearing.

The IAD 134 drives a pinion gear 152 that is in meshing engagement with a ring gear 154 that is operably coupled to a differential 156 for the forward drive axle 18. The pinion gear 152 is a two-piece design with a first piece 158 that defines a pinion gear head 160 with a plurality of pinion gear teeth 162. The first piece 158 includes a hollow sleeve portion 164 that extends outwardly from the pinion gear head 160 toward the IAD 134. The pinion gear 152 includes a second piece 166 that defines a hollow pinion support shaft 168 having an inner end 170, an outer end 172, and center flange portion 174. The two pieces 158, 166 are preferably fastened together with at least one fastening component 176, however, other known connection components could also be used. Preferably, the fastening component 176 is a nut threaded onto the second piece 166.

The second piece 168 extends through the hollow sleeve portion 164 with the inner end 170 extending inwardly beyond the pinion gear head 160. The outer end 172 extends into the IAD 134 to apply a thrust load to the IAD bearing assembly 150 to permit reverse load sharing. The thru-shaft 138 extends through the hollow pinion support shaft 168 such that the thru-shaft 138 and pinion gear 152 rotate about a common axis 178. One benefit with this configuration is that the need for a separate pumping mechanism to force feed oil through the assembly is eliminated.

A distal end 180 of the hollow sleeve portion 164 abuts against the center flange portion 174 to properly locate the first 158 and second pieces relative to one another. In the preferred embodiment, an outer end 182 of the thru-shaft 138 is fixed for rotation with the outer side gear 146 of the IAD 134 and the second piece 166 of the pinion gear 152 is fixed for rotation with the inner side gear 144. Preferably, the inner side gear 144 is splined to an outer surface of the second piece 166 at a center position adjacent to the central flange portion 174. The thru-shaft 138 extends through the second piece 166 such that independent rotation between thru-shaft 138 and the second piece 166 is permitted. The carrier assembly 130 optionally includes a differential locking assembly, shown generally at 184, to selectively lock the inner side gear 144, pinion gear 152, and thru-shaft 138 together for rotation at the same speed.

The pinion gear 152 is rotatably supported by an inner bearing 186 and an outer bearing 188. The inner 186 and outer 188 bearings are positioned on opposing sides of the pinion gear head 160. The inner bearing 186 is supported between the second piece 166 and a carrier housing member 190 and the outer bearing 188 is supported between the first piece 158 and the carrier housing member 190. The outer bearing 188 abuts against the center flange portion 174 of the second piece 166. Preferably, the inner and outer bearings 186, 188 are single tapered roller bearings. Due to the raising of the pinion position about axle centerline, discussed in greater detail below, the outer bearing 188 is larger in size than the inner bearing 186.

A bearing preload spacer 192 is positioned between the pinion gear head 160 and the inner bearing 186. The fastening component 176 abuts against the inner bearing 186 and can be adjusted to apply the desired preload bearing force.

In the preferred embodiment, the outer end of the second piece 166 of the pinion gear 152 abuts against the outer side gear 146 to apply the thrust load to the IAD bearing assembly 150. This allows the IAD bearing assembly 150 to share reverse loading, which in turn allows the inner bearing 186 to be small enough to clear the ring gear 154.

The differential assembly 156 includes a first differential case half 194, a second differential case half 196, and a differential gear assembly. The first 194 and second 196 differential case halves support the differential gear assembly. The differential gear assembly includes four (4) differential pinion gears 198 (only two are shown), supported on a four-legged differential spider 200 as is known in the art. The differential pinion gears 198 intermesh with a pair of side gears 202 that are splined to the axle shafts 32.

The ring gear 154 includes a back face 204 and a front face 206 on which a plurality of ring gear teeth 208 are formed. The pinion gear teeth 162 intermesh with the ring gear teeth 208 to drive the differential assembly 156. The first 194 and second 196 differential case halves are attached to each other, defining a differential case split line 210 that is positioned on the back face 204 of the ring gear 154. The ring gear 154, first differential case half 194, and second differential case half 196 are all connected together at a single bolted joint 212 with a plurality of fasteners 214.

Movement of the differential case split line 210 behind the ring gear 154 allows the same fasteners 214 to hold both the case halves 194, 196 together as well as the ring gear 154 to the case halves 194, 196. This reduces the number of bolted joints from two to one.

One benefit with this differential assembly configuration is that larger differential components can be used within the packing space defined by a traditional configuration. In the subject configuration, the differential case diameter is not restricted by the proximity of the pinion gear, as in traditional configurations. Thus, the size of the differential case components and gearing can be enlarged to increase robustness.

The differential assembly 156 is rotatably supported within the carrier assembly 130 by at least one tapered roller bearing 216. The improved differential case configuration permits the bearing 216 to be mounted in a reverse configuration. The bearing 216 includes a plurality of rollers 218 defining bearing apexes that diverge away from one another in a direction extending outwardly from the back face 204 of the ring gear 154. This reverse bearing configuration provides more stability and reduces the need for thrust screws.

As discussed above, the thru-shaft 138 has a first end 182 fixed to the outer side gear 146 of the IAD 134 and a second end 220 coupled to the output 136. The second end 220 of the thru-shaft 138 is preferably supported by a single tapered roller bearing 222. The tapered roller bearing 222 is positioned between the thru-shaft 138 and the carrier housing member 190. The carrier housing member 190 is fastened to an axle housing member 224 as is known in the art. The carrier mounting casting is extend to the bowl side of the carrier assembly 130 and includes a projection 226 that locates into the housing 224. The projection 226 supports the bearing 222 and eliminates the need for a separate bearing cage member in the housing 224. This configuration also provides improved alignment of the thru-shaft 138 in the carrier assembly 130.

Figure 5:
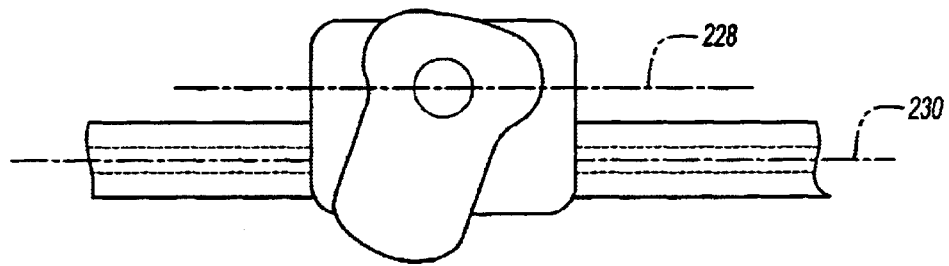
FIG. 5 is a schematic front view of the carrier assembly of FIG. 4 incorporated into the forward drive axle.

The input at the pinion gear 152 defines a pinion centerline 228, shown in FIG. 5, which is vertically higher than an axle centerline 230 defined by the axle shafts 32. In this configuration the drive load pulls on the pinion gear 152 rather than pushing on the pinion gear 152 as is done in traditional configurations. The use of a two-piece pinion gear 152 that abuts against the outer side gear 146 of the IAD 134 permits reverse load sharing with the IAD bearing assembly 150. Further, this configuration permits the inner pinion bearing assembly size to be decreased.

The subject invention provides an improved carrier assembly for a forward drive axle of a tandem set that includes a more robust component configuration within a traditional package. This carrier configuration further reduces the overall number of required components and is less expensive to manufacture. Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A carrier assembly for a forward drive axle of a tandem axle set comprising:
    an input;
    an inter-axle differential operably coupled to said input and rotatably supported on an inter-axle differential bearing assembly;
    a pinion gear operably coupled to said inter-axle differential for rotation about a pinion gear axis of rotation, said pinion gear having a first piece defining a pinion gear head and a second piece defining a pinion shaft with a hollow center portion, said pinion shaft having an inner end for supporting said first piece and an outer end extending into said inter-axle differential assembly for applying a thrust load to said inter-axle differential bearing assembly;
    a thru-shaft extending through said hollow center portion of said second piece for rotation about a thru-shaft axle of rotation; and
    an output operably coupled to said thru-shaft for transferring driving force to a rear drive axle.

2. An assembly as set forth in claim 1 wherein said pinion gear axis of rotation and said thru-shaft axis of rotation are collinear.

3. An assembly as set forth in claim 1 wherein said pinion gear is supported by a pair of bearings including an outer bearing mounted on said first piece and an inner bearing mounted on said inner end of said pinion shaft.

4. An assembly as set forth in claim 3 wherein said inner and outer bearings are mounted on opposing sides of said pinion gear head.

5. An assembly as set forth in claim 3 wherein said outer bearing has a larger diameter than said inner bearing.

6. An assembly as set forth in claim 3 wherein said outer bearing is a single tapered roller bearing and said inner bearing is a single tapered roller bearing.

7. An assembly as set forth in claim 1 wherein said second piece has a center flange portion and wherein said first piece has a sleeve portion extending outwardly from said pinion gear head along said pinion gear axis of rotation, said sleeve portion in abutting engagement with said center flange portion to locate said first piece relative to said second piece.

8. An assembly as set forth in claim 1 wherein said first and second pieces are connected together with at least one fastener.

9. An assembly as set forth in claim 1 including a ring gear driven by said pinion gear for rotation about a ring gear axis of rotation transverse to said pinion gear axis of rotation, said ring gear having a back side and an opposing front side having a plurality of ring gear teeth in meshing engagement with a plurality of pinion gear teeth formed on said pinion gear head, and a differential assembly operably coupled to said ring gear for driving a pair of axle shafts defining an axle shaft axis of rotation, said pinion axis of rotation being positioned vertically higher than said axle shaft axis of rotation.

10. An assembly as set forth in claim 9 wherein said differential assembly includes a first differential case half, a second differential case half attachable to said first differential case half at an interface to define a case split line, and a differential gear assembly supported by said first and second case halves and operably coupled to drive said axle shafts wherein said case split line is positioned on said back side of said ring gear.

11. An assembly as set forth in claim 10 wherein said ring gear, first differential case half, and second differential case half are all connected together via a single bolted joint.

12. An assembly as set forth in claim 10 wherein said differential assembly is supported by at least one tapered roller bearing with a plurality of rollers defining bearing apexes that diverge away from one another in a direction extending outwardly from said back side of said ring gear.

13. An assembly as set forth in claim 1 wherein said inter-axle differential bearing assembly is a single tapered roller bearing.

14. An assembly as set forth in claim 1 wherein said inter-axle differential includes a differential spider, a plurality of spider gears supported on said differential spider, an inner side gear in meshing engagement with said spider gears, and an outer side gear in meshing engagement with said spider gears.

15. An assembly as set forth in claim 14 wherein one end of said thru-shaft is fixed for rotation with said outer side gear and wherein said inner side gear is fixed for rotation with said second piece of said pinion gear.

16. An assembly as set forth in claim 15 wherein said inner side gear is splined to said second piece at a central position between said inner and outer ends.

17. An assembly as set forth in claim 14 wherein said outer end of said second piece abuts against said outer side gear to apply the thrust load to said inter-axle differential bearing assembly via said outer side gear.

18. An assembly as set forth in claim 1 wherein said thru-shaft has a first end fixed to an outer side gear of said inter-axle differential and a second end coupled to said output and wherein said second end is supported by a single tapered roller bearing.

19. An assembly as set forth in claim 18 wherein said tapered roller bearing is positioned between said thru-shaft and a carrier housing.

20. An assembly as set forth in claim 19 wherein said carrier housing is fastened to an axle housing.

21. A carrier assembly for a forward drive axle of a tandem axle set comprising:
    an input;
    an inter-axle differential operably coupled to said input and rotatably supported on an inter-axle differential bearing assembly, said inter-axle differential including a differential spider, a plurality of spider gears supported on said differential spider, an inner side gear in meshing engagement with said spider gears, and an outer side gear in meshing engagement with said spider gears;

a pinion gear operably coupled to said inter-axle differential for rotation about a pinion gear axis of rotation, said pinion gear having a first piece defining a pinion gear head and a second piece defining a pinion shaft with a hollow center portion, said pinion shaft being fixed for rotation with said inner side gear and having an inner end for supporting said first piece and an outer end in abutting engagement with said outer side gear for applying a thrust load to said inter-axle differential bearing assembly;

a thru-shaft extending through said hollow center of said second piece and having one end fixed for rotation with said outer side gear; and an output operably coupled to said thru-shaft for transferring driving force to a rear drive axle.

22. An assembly as set forth in claim 21 wherein said pinion gear is supported by a pair of tapered roller bearings including an outer tapered roller bearing mounted on said first piece and an inner bearing mounted on said second piece with said inner and outer tapered roller bearings being positioned on opposing sides of said pinion gear head.

23. An assembly as set forth in claim 21 wherein said first piece has a central bore that surrounds said inner end of said second piece.

24. An assembly as set forth in claim 21 including a ring gear driven by said pinion gear for rotation about a ring gear axis of rotation transverse to said pinion gear axis of rotation, said ring gear having a back side and an opposing front side having a plurality of ring gear teeth in meshing engagement with a plurality of pinion gear teeth formed on said pinion gear head, and a differential assembly including a first differential case half, a second differential case half attachable to said first differential case half at an interface to define a case split line, and a differential gear assembly supported by said first and second case halves and operably coupled to drive a pair of axle shafts wherein said ring gear, first differential case half, and second differential case half are all connected together via a single bolted joint.

25. An assembly as set forth in claim 24 wherein said case split line is positioned on said back side of said ring gear.

\* \* \* \* \*